United States Patent [19]

Knight et al.

[11] Patent Number: 4,891,459

[45] Date of Patent: Jan. 2, 1990

[54] OIL PRODUCTION BY ENTRAINED PYROLYSIS OF BIOMASS AND PROCESSING OF OIL AND CHAR

[75] Inventors: James A. Knight; Charles W. Gorton, both of Atlanta, Ga.

[73] Assignee: Georgia Tech Research Corporation, Atlanta, Ga.

[21] Appl. No.: 819,592

[22] Filed: Jan. 17, 1986

[51] Int. Cl.⁴ ............................ C07C 1/00; C07C 4/00
[52] U.S. Cl. ........................................ 585/240; 201/8; 201/37; 201/38
[58] Field of Search ................ 585/240, 241; 201/2.5, 201/25, 31, 36, 37, 38, 8

[56] References Cited

U.S. PATENT DOCUMENTS

| | | | |
|---|---|---|---|
| 2,551,579 | 5/1951 | Berl | 585/240 |
| 3,298,928 | 1/1967 | Esterer | 201/6 |
| 4,145,256 | 3/1979 | Bowen | 201/25 |
| 4,266,083 | 5/1981 | Huang | 585/240 |
| 4,313,011 | 1/1982 | Weil et al. | 585/240 |
| 4,778,585 | 10/1988 | Graff | 208/403 |

FOREIGN PATENT DOCUMENTS

| | | | |
|---|---|---|---|
| 0932686 | 8/1973 | Canada | 201/31 |
| 0029580 | 6/1981 | European Pat. Off. | 201/25 |
| 0036371 | 9/1981 | European Pat. Off. | 201/25 |
| 0108317 | 5/1984 | European Pat. Off. | 201/25 |
| 2178061 | 11/1973 | France | 585/241 |

OTHER PUBLICATIONS

Steinberg et al., "Flash Hydropyrolysis of Biomass", 12th Biomass Thermochem. Conv. Contract. Meeting, Mar. 1981.

Primary Examiner—Olik Chaudhuri
Attorney, Agent, or Firm—Hurt, Richardson, Garner, Todd & Cadenhead

[57] ABSTRACT

Entrained pyrolysis of lignocellulosic material proceeds from a controlled pyrolysis-initiating temperature to completion of an oxygen free environment at atmospheric pressure and controlled residence time to provide a high yield recovery of pyrolysis oil together with char and non-condensable, combustible gases. The residence time is a function of gas flow rate and the initiating temperature is likewise a function of the gas flow rate, varying therewith. A controlled initiating temperature range of about 400° C. to 550° C. with corresponding gas flow rates to maximize oil yield is disclosed.

19 Claims, 2 Drawing Sheets

OIL PRODUCTION BY ENTRAINED PYROLYSIS OF BIOMASS AND PROCESSING OF OIL AND CHAR

BACKGROUND OF THE INVENTION

It is known that lignocellulosic materials such as wood waste products will yield char, an organic liquid phase and non-condensable gases as well as water when the material is subjected to pyrolysis. Initially, efforts were directed to pyrolysis of the material when it was in the form of a more or less fixed, compact bed thereof or with the bed being fluidized. The yield of useful products, particularly organic liquid phase, was no high. More recently, as is set forth in Esterer patent 3,298,928, fluidized bed pyrolysis of lignocellulosic material has been used to recover levoglucosan along with char and organic liquid phase as well as combustible gases. The levoglucosan is recovered from the aqueous phase of the condensable gases and the yield of organic liquid phase is also low (i.e., less than 35%).

Single stage, entrained pyrolysis of lignocellulosic materials at atmospheric pressure is a very energy efficient conversion process. The products of this pyrolysis are an organic liquid phase, char, gases and water. The organic liquid phase, hereinafter wood pyrolysis oil, is a versatile product and has been used successfully as a fuel in commercial kiln operation and in the operation of power boilers. It has been blended with pulverized char and/or fuel oils to provide an acceptable fuel oil in commercial applications. It has also been demonstrated to be a technically viable fuel for use in gas turbines. Wood pyrolysis oil also has potential as a chemical feedstock.

Therefore, it would be desirable to utilize such an energy efficient process in order to yield significantly greater yields of wood pyrolysis oils than have heretofore been possible.

BRIEF SUMMARY OF THE INVENTION

It is a primary concern of this invention to provide a process for the pyrolytic decomposition of lignocellulosic materials which produces a high yield of wood pyrolysis oil.

Basic to this invention is the discovery that the entrained pyrolysis of lignocellulosic materials can be made to produce high yields of wood pyrolysis oil if the temperature which characterizes the onset of pyrolysis is controlled in consonance with the time during which pyrolysis is permitted to proceed.

More particularly, a highly energy efficient process is obtained by the pyrolysis of lignocellulosic materials in a single stage entrainment carried out at substantially atmospheric pressure to produce high yields of wood pyrolysis oil when the temperature and time duration are controlled as aforesaid. Generally speaking, as the temperature is increased the time duration must be diminished to obtain the highest yields of wood pyrolysis oil and, within the range of temperatures at which reasonably high yields may be obtained, there is a temperature or narrow range thereof, where maximum yield is obtained. By "high yield" as used herein, wood pyrolysis oil yield of at least about 35% on a weight percent basis to moisture and ash-free feed is meant. Based upon the results of prototypical testing as disclosed herein, yields of more than 50% are readily achieved. Further, on the basis of mathematical modeling derived from the prototypical testing, yields of more than 60% are attainable.

More particularly, the invention disclosed herein involves pyrolysis of lignocellulosic material (e.g., wood, forestry residues, agriculture residues and similar lignocellulosic materials including peat) by entrainment thereof in combustion product gases (i.e., in the substantial absence of oxygen) at atmospheric pressure to provide a high yield of wood pyrolysis oil along with non-condensable (combustible) gaseous phase and char. The inlet temperature control of the entraining column of pyrolyzing gases at the region where pyrolysis commences is controlled to lie within a selected range and, for each given inlet temperature within this range, the effective residence time during which the cellulosic material is being subjected to pyrolysis is controlled in order to provide the desired yield of wood pyrolysis oil attainable at that temperature. Whereas the residence time of the lignocellulosic material during which it is being subjected to pyrolysis cannot be stated with precision because of the uncertainty of the precise time that an individual particle of the lignocellulosic material remains in the region of pyrolysis, the residence time can be indicated by reference to the flow rate of the total inlet gases passing into the pyrolysis reactor where the reactor is of fixed length and diameter. The total inlet gas feed rate based upon a reactor tube of fixed length and diameter can be defined for maximum pyrolysis yield at each temperature selected within the temperature range of interest.

An object of this invention is to provide a method as aforesaid within the uield of pyrolytic wood woil is of a value in excess of those previously known in the art.

More particularly, an object of this invention is to effect entrained flow pyrolysis of lignocellulosic material by controlling the particle size of the material to be within a relatively small range, controlling the relative flows of inlet gases and thus the inlet temperature at which pyrolysis begins, and substantially maximizing the recovery of wood pyrolysis oil by controlling the flow of total inlet gases entering the reactor.

Specifically, it is an object of this invention to effect the aforesaid controls to achieve a yield of wood pyrolysis oil which is in excess of about 35-50% by weight of the dry ash-free weight of the lignocellulosic material. To this end, the controlled temperature range is about 400-550° C. or higher.

Another object of this invention is the provision of a method in which the heat of the products of pyrolysis is advantageously utilized. For example, the hot organic vapors recovered from the reaction zone when pyrolysis has been completed or substantially completed may be catalyzed (with or without added hydrogen) to remove oxygen (as water) to produce aromatic, olefinic and paraffinic compounds. This product is an excellent feedstock for conversion to gasoline and diesel fuels and for petrochemical processes for the manufacture of plastics, synthetic fibers, etc. Alternatively or in parallel, the hot organic vapors may be subjected to thermal cracking to unsaturated hydrocarbon gases such as acetylene, ethylene, propylene and the butenes.

The hot organic vapors may also be converted by partial oxidation to carbon black in an oxidation reactor.

The hot and highly reactive char recovered may be converted directly to activated carbon as, for example, by entrainment in and reaction with steam.

These, together with other objects of the invention will become more evident with reference to the following detailed description.

BRIEF DESCRIPTION OF THE DRAWING FIGURES

FIG. 1 is a diagrammatic illustration of the invention which indicates the general principles thereof; and FIG. 2 is a more detailed diagram of an embodiment of the invention.

DETAILED DESCRIPTION OF THE INVENTION

Figure 1:
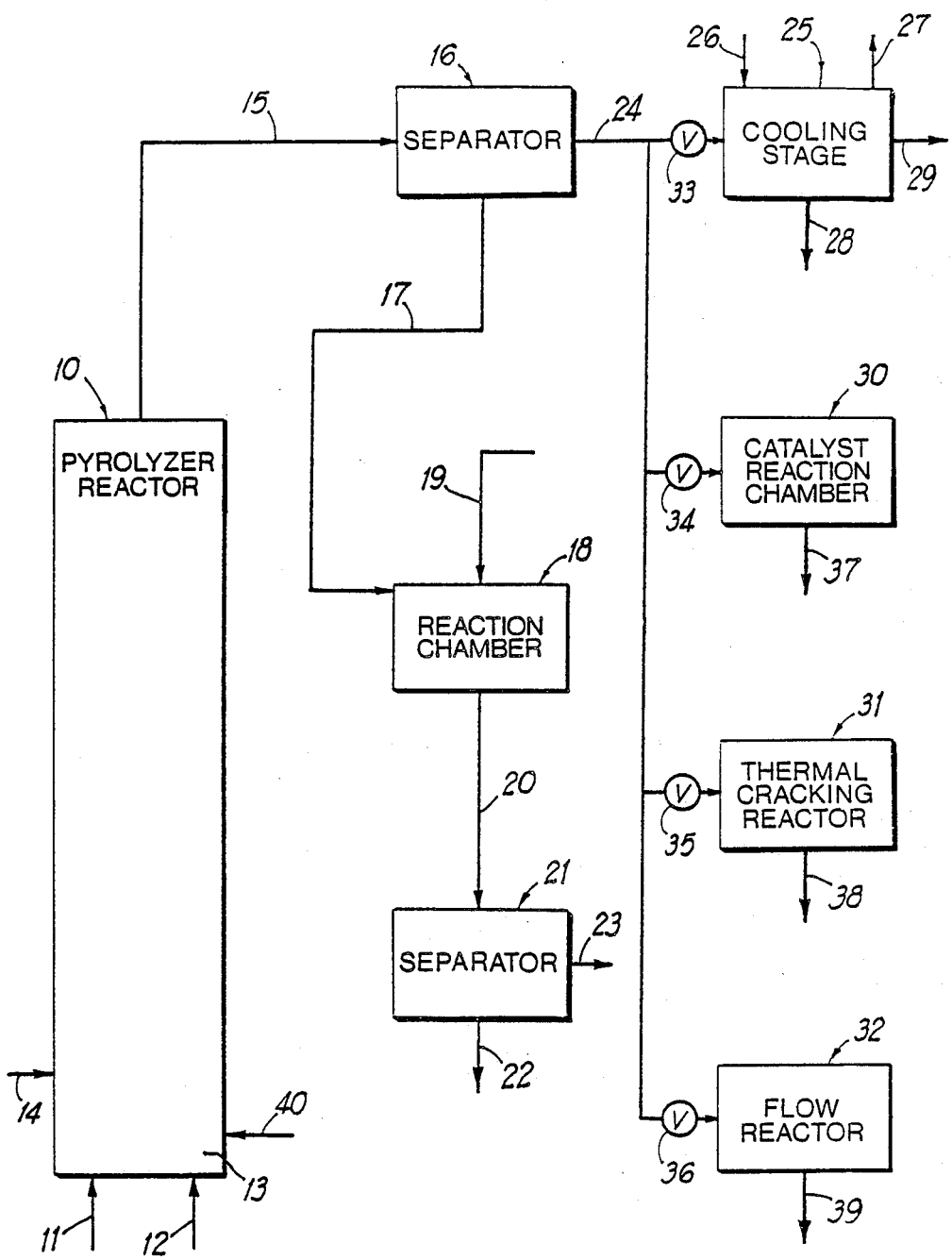

As shown in FIG. 1, the pyrolyzer 10 comprises an elongate chamber which may be vertically disposed or it may be in any other orientation. At the inlet end, fuel and air are introduced at 11 and 12 stoichiometrically to form gaseous products of combustion in the lower region 13 of the pyrolyzer. These gases contain substantially no oxygen. Above this region, particulate lignocellulosic material is introduced at 14 pneumatically conveyed in a cooled carrier gas, at a region in which the inlet temperature to which the lignocellulosic material particles are initially subjected to pyrolysis is within a temperature range hereinafter described. The flow rate of the generated combustion gases plus that of the gases introduced at 14 and 40 (the flow rate of the total inlet gases) is controlled such that the particles of lignocellulosic material become entrained in these inlet gases, are well separated therein to move with the gaseous stream toward the outlet end of the pyrolyzer 10, and are subjected to the desired inlet temperature for pyrolysis. The cooled carrier gas which conveys the particulate cellulosic material is substantially free of oxygen and such cooled gas can be introduced as needed at 40 as a temperature moderating gas.

Pyrolysis is substantially completed within the chamber 10 and a combination of noncondensable gases, water vapor (entering moisture plus that produced by combustion and pyrolysis), char, and pyrolysis oil vapors is discharged in the line 15. The temperature of the stream at 15 is somewhat less than the inlet temperature, usually about 30-45° C. less. Hot char is removed at the stage 16 and may be immediately directed, as indicated at 17, to the reaction chamber 18.

The hot char at 17 is in a highly reactive state and may be converted to activated carbon by entrainment in and reaction with steam introduced at 19 so that activated carbon and a mixture consisting primarily of activated char, steam, hydrogen, carbon monoxide, carbon dioxide and hydrocarbon gases exits at 20. Thereafter, the activated carbon is removed at the stage 21 and recovered for use at 22 whereas the gaseous/vapor phase is recovered and leaves the system at 23. It will be appreciated that solids removal in the stages 16 and 21 may be effected by conventional means such as cyclones.

It will also be understood that the conversion of the hot char to activated carbon in the reactor 18 is preferably effected without significant cooling of the hot, highly reactive char entering at 17. For this purpose, the steam input temperature at 19 may be sufficiently high to assure this, or the reaction chamber 18 may be indirectly heated as by combustion of fuel such as combustible off gases of the system. Further, it is to be understood that the hot char at 17 may alternatively be recovered directly without the subsequent activation thereof.

After removal of the hot char at 16, the gases and vapors are discharged at 24 and may be subjected to indirect cooling in the stage 25. The input and output lines 26 and 27 of a suitable cooling medium such as air are illustrated although it will be understood that any suitable indirect cooling may be effected at a temperature at which the organic vapors with some water will be condensed to a liquid phase which is recovered at 28 whereas the water vapor and noncondensable gases leave the system at 29 for recovery as fuel.

As an alternative to or in parallel with the cooling stage 25, all or some of the stream discharged at 24 may be directed to one or more of the stages 30, 31 and 32. The valves 33, 34, 35 and 36 illustrate the flow controls which may be effected. The stage 30 represents catalyst (e.g., zeolites) reaction stage in which the hot mixture of organic vapors, water vapor and noncondensable gases are processed to produce gaseous and liquid hydrocarbons at 37 which are enriched as to hydrocarbon content.

The stage 31 represents a vapor phase thermal cracking reactor to produce ethylene, propylene and other hydrocarbon gases exiting at 38. It will be understood that heat is supplied by a suitable fuel which may be a portion of the products of pyrolysis.

The stage 32 represents a flow reactor in which the hot mixture of organic vapors, water vapor and noncondensable gases is subjected to partial oxidation to yield carbon black at 39.

The various stages mentioned above are all known and understood by those skilled in the art and further description thereof is deemed unnecessary.

Figure 2:
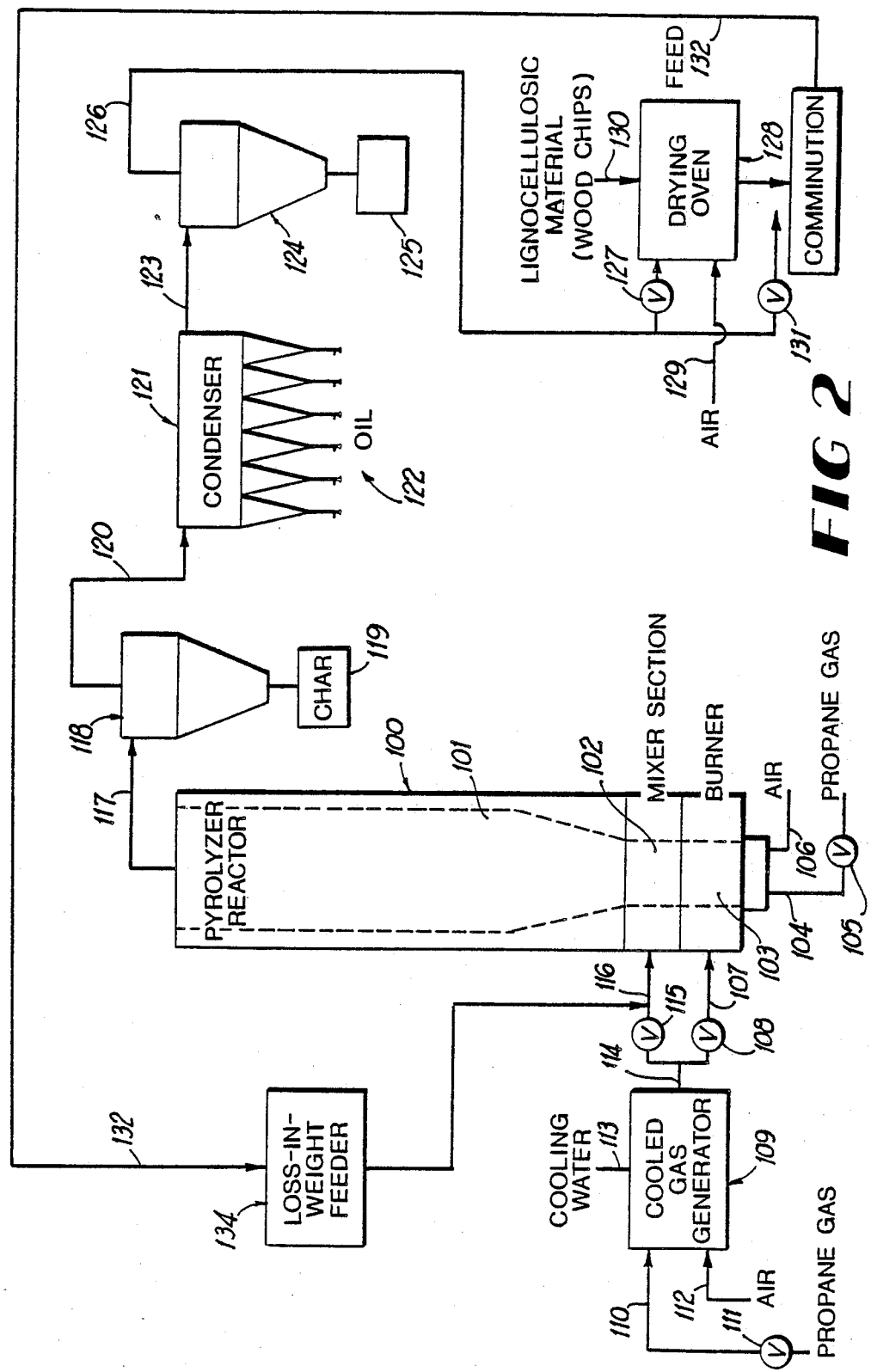

As noted above, the invention is directed primarily to entrained pyrolysis of cellulosic material to maximize the yield of wood pyrolysis oil. FIG. 1 illustrates this feature plus the possibilities for further product recovery. In FIG. 2, a flow diagram of a prototype system is illustrated to demonstrate the importance of pyrolysis time and temperature control in accord with this invention.

The reactor 100 includes the reactor tube section 101. A mixer section 102 and a burner section 103. The reaction tube section 101 is a 21 foot long stainless steel pipe of 8 inch ID.

Propane gas is introduced into the burner section at line 104 in amount controlled by the valve 105 and an essentially stoichiometric amount of air is also introduced in the line 106. Temperature moderating gas is also introduced as required into the burner section through the line 107 under control of the valve 108. This gas is generated in the burner/cooler 109 wherein propane gas is burned in the presence of a substantially stoichiometric amount of air. This fuel is introduced through the line 110 as controlled by the valve 111 and the proper amount of air is introduced through the line 112. The products of combustion in the generator 109 are then quenched by the introduction of a sufficient amount of water through the line 113 and a suitable internal spraying device to cause the combustion gases to exit at the line 114 saturated with water vapor at a cooled temperature which may be about 38° C. Other means for supplying inert gas (oxygen free) may be used. Recycled product gas may be used directly as is without combustion. Also, feed, product gas, or char may be used instead of propane and burned stoichiometrically with air. In addition, the feed material could be conveyed with air in such a proportion that only a partial oxidation occurs sufficient to provide the energy needed to obtain the appropriate reactor temperature.

This cooled, inert gas is split into two streams, one of which is the temperature moderating stream 107 entering the burner section 103 through the valve 108 and the other of which is the secondary temperature moderating carrier stream 116 passed through the valve 115 and into which the dried lignocellulosic material is continuously and uniformly introduced. The feeder 134 introduces the lignocellulosic feed from the line 132 at a predetermined rate into the carrier stream 116 so that it is pneumatically conveyed into the mixer section 102. The inlet temperature of the total gases mixture entering the section 102 commences the entrained pyrolysis of the lignocellulosic material at the inlet of the reactor tube 101 and this temperature is controlled by the amount of propane and air burned in the burner section 103 as temperature moderated by the amount of cooled moderating gas entering the burner section through the line 107 as well as the amount of carrier gas entering the mixing section 102 through the line 116.

The entrained pyrolysis proceeds in the reactor tube 101 under substantially atmospheric pressure and the temperature of the stream leaving the reactor tube, as indicated at the line 117 is less, typically about 45° C. less, than the inlet temperature of the total gases entering the reactor tube 101.

The mixture entering the reactor tube 101 consists of inert or substantially oxygen free temperature moderating gas supplied at 107, inert conveying or temperature moderating carrier gas entering at 116, combustion products of both the burner section 103 and the inert gas generator 109, water vapor and feed particles, all moving vertically upwardly in the reactor tube 101. The resulting mixture in the line 117 consists of noncondensable gases, water vapor (entering moisture plus moisture produced by pyrolysis), pyrolysis oil vapors and char particles. In the cyclone 118, almost all of the char particles are removed and collected at 119 and the stream 120 leaving the cyclone 118 consists of non-condensable gases, water vapor, pyrolysis oil vapors, aerosol and some char fines. This mixture enters the air cooled condenser 121 where the pyrolysis oil and some water vapor are recovered as condensed phases as indicated at 122 by suitable sumps and collection receivers. The exiting mixture at 123 consists of non-condensable gases, water vapor, light oil vapors and an aerosol of pyrolysis oil. This mixture is fed to the demister 124 where most of the aerosol is removed and recovered at 125. The line 126 consists mainly of non-condensable gases, water vapor and some residual aerosol, some of which may be diverted through the valve 127 to the drying oven 128 where it is burned in the presence of air supplied at 129 to dry the wood chips which are supplied to the oven as indicated at 130. The remainder of the stream is passed through the valve 131 for on-site use. The dried feed is then comminuted and passed to the feeder 134 as indicated at 132.

Data with reference to eleven screening runs are presented in the following table:

TABLE 1

| Run # | Temp.[a] °C. | Inlet gas rate lb/hr | Feed[b] rate lb/hr (maf) | Feed[c] Screen Size | % Oil[d] Yield dry basis | % Char Yield dry basis |
|---|---|---|---|---|---|---|
| 13 | 504 | 194 | 52.9 | 40 × 50 | 35.0 | 7.8 |
| 14 | 454 | 184 | 63.1 | 40 × 50 | 41.8 | 13.1 |
| 15 | 549 | 210 | 56.7 | 40 × 50 | 31.0 | 6.1 |
| 16 | 404 | 188 | 63.2 | 40 × 50 | 33.7 | 20.0 |
| 17 | 416 | 198 | 59.2 | 40 × 50 | 40.1 | 19.8 |
| 18 | 471 | 206 | 62.5 | 40 × 50 | 49.4 | 12.0 |
| 19 | 471 | 223 | 59.0 | 50 × 60 | 46.0 | 7.9 |
| 20 | 471 | 254 | 84.7 | 40 × 50 | 51.3 | 12.9 |
| 21 | 477 | 281 | 113.2 | 40 × 50 | 47.6 | 10.7 |
| 22 | 460 | 220 | 89.6 | 50 × 60 | 46.0 | 9.0 |

[a.] Reference temperature - K thermocouple located at the entrance to the reactor tube.
[b.] maf—moisture-ash-free.
[c.] Sieve cut as produced with Sweco screener.
[d.] The oil yield represents on a dry basis the organic material of the condensates from the condenser, demister, the gas and vapor sampling train (downstream of the demister) and the tarry deposits in the first section of the condenser. Yield based on maf feed.

The results of the above screening runs were analyzed using non-linear least squares with a postulated kinetics model.

The purpose of the modeling effort was to give some insight into the chemical kinetics of hardwood pyrolysis, and to develop a means of using the results of the screening runs as a guide for planning future experiments. The decision was made to use a non-linear least-squares procedure to determine numerical values for the pertinent parameters which could then be used to predict the oil yield. Rather than use a polynomial expression with no physical significance, the model was idealized to two series, first order, irreversible reactions. Further, the assumption was made that the reactions took place under isothermal conditions (at the temperature at the reactor entrance). Although the reactor is not isothermal, the assumption of isothermal conditions is believed to be sufficient for this preliminary modeling effort. A more detailed model which includes particle dynamics and transient heating is presently being developed. The results being reported here will serve as the starting point for this second generation model.

The first reaction is indicated symbolically by the following:

$$\text{Hardwood} \rightarrow \text{Oil} + \text{Char} + \text{Gases} \quad (1)$$

Similarly, the second reaction is given by the following:

$$\text{Oil} \rightarrow \text{``Char''} + \text{Gases} \quad (2)$$

The "char" in reaction (2) is considered to be different from the usual pyrolytic char.

Instead of using a residence time, the space time based on the total inlet gas flow rate was used. The residence time cannot be determined without the use of a detailed mathematical model which includes the effect of pyrolysis gas and vapor evolution as well as particle lag (particle velocity is not the same as the gas velocity). The development of such a detailed model has been initiated, but the model is not available at this time.

The expressions for the rate constants used ($k_1$, $k_2$) are:

$$k_1 = b_1 \exp(-b_2/T) \quad (3)$$

$$k_2 = b_3 \exp(-b_4/T) \quad (4)$$

where $b_1$ and $b_3$ are preexponential factors, and $b_2$ and $b_4$ are the respective activation energies divided by the gas constant. Using the well-known solution to the idealized problem, the following expression was used to give the predicted fractional oil yield, where $b_5$ corresponds to the maximum fractional conversion of wood to oil (without a secondary reaction).

$$F = \frac{k_1 \, b_5}{k_2 - k_1} [\exp(-k_1 t) - \exp(-k_2 t)] \quad (5)$$

The objective function for the nonlinear least-square computer program consisted of an expression for the space time (which did not include any parameters to be determined) plus equations (3) through (5) which have a total of five parameters ($b_1$ to $b_5$). An available computer code (from the International Mathematics and Science Library) was used with the experimentally determined values of temperature, inlet gas flow rates, and corresponding oil yields for the 10 screening runs to determine the parameters. The nonlinear least-squares results are given in Table 2.

TABLE 2

| Parameter | Value |
| --- | --- |
| $b_1$ | $1.483 \times 10^6$ s$^{-1}$ |
| $b_2$ | 10,760 K ($E_1$ = 21.38 kcal/g mole) |
| $b_3$ | 23.12 s$^{-1}$ |
| $b_4$ | 3554 K ($E_2$ = 7.06 kcal/g mole) |
| $b_5$ | .811 |

A comparison between the experimental and calculated oil yields is given in Table 3. The average percent deviation between the experimental and calculated results listed in Table 3 is 4.1%. In order to consider the trends based on the modeling results, Table 4 was prepared using the range of temperatures covered in the experimental runs and also essentially the same range of total inlet gas flow rates.

TABLE 3

| Run No. | Temperature °C. | Inlet Gas Rate lb/hr | % Oil Yield Experimental | % Oil Yield Calculated |
| --- | --- | --- | --- | --- |
| 16 | 404 | 188 | 33.7 | 34.7 |
| 17 | 416 | 198 | 40.1 | 38.6 |
| 14 | 454 | 184 | 41.8 | 44.0 |
| 18 | 471 | 206 | 49.4 | 44.9 |
| 19 | 471 | 223 | 46.0 | 46.7 |
| 20 | 471 | 254 | 51.3 | 48.9 |
| 21 | 477 | 281 | 47.7 | 50.3 |
| 22 | 460 | 220 | 46.0 | 46.8 |
| 13 | 504 | 194 | 35.2 | 36.8 |
| 15 | 549 | 210 | 31.0 | 30.5 |

TABLE 4

| Temperature °C. | Inlet Gas Rate (lb/hr) | | |
| --- | --- | --- | --- |
| | 150 | 200 | 250 |
| | % Oil Yield | | |
| 400 | 35 | 33 | 30 |
| 425 | 40 | 41 | 40 |
| 450 | 40 | 45 | 47 |
| 475 | 35 | 44 | 49 |
| 500 | 29 | 39 | 46 |
| 525 | 24 | 33 | 41 |
| 550 | 20 | 29 | 36 |

As indicated by the results, for a given inlet gas rate, the oil yields increase as the temperature increases above 400° C. and reach a maximum before a temperature of 550° C. is reached. Although it is not obvious from Table 4, for a given temperature there is a flow rate which gives the maximum oil yield. As a matter of fact, this can be predicted analytically for the idealized model used. The results of such calculations are summarized in Table 5.

TABLE 5

| Temperature (°C.) | Maximum Oil Yield (%) | Inlet Gas Rate for Maximum Yield (lb/hr) | Space Time (s) |
| --- | --- | --- | --- |
| 400 | 35 | 128 | 7.1 |
| 425 | 41 | 185 | 4.7 |
| 450 | 47 | 261 | 3.2 |
| 475 | 52 | 363 | 2.2 |
| 500 | 56 | 499 | 1.6 |
| 525 | 60 | 674 | 1.1 |
| 550 | 63 | 899 | .82 |

The temperature range used in determining the results in Table 5 is the same as that of the experimental results. Although some of the inlet gas rates in Table 5 are greater than those used in the experiments, the results are not really extrapolations. The reason is that the true residence time, which is reflected in the space time s, is the key parameter. Instead of increasing the gas flow, the residence time can be reduced by shortening the reactor, by decreasing the flow area, or both.

In Tables 1 and 3, runs 18 and 20 were identical except for the gas flow rates of 206 and 254 lb/hr, with run 20 yielding the highest % of pyrolysis oil of all the runs tabulated. Indeed, it appears that a temperature of about 475° C. may be optimum for pyrolysis oil yield, provided the flow rate is adjusted accordingly. This is borne out in Table 4 within the temperature range of 400-550° C., clearly indicating the increase in oil recovery as the flow rate is increased to an optimum value. In this table, the relation between flow rate and temperature is also clearly evident. Thus, at 400° C. it is seen that the flow rate of 150 lb/hr is probably too high; that at 425° C. the flow rate of 200 lb/hr is near optimum; that at 450° C. the flow rate of 250 lb/hr is low, and so on. Table 5 provides more information on the interdependence between temperature and gas flow rate and specifies particular values at maximum oil yields, based on modeling. This table also illustrates that although the yield increases with temperature, the gas flow rates increase rapidly.

Comparing Tables 1 and 5, it will be seen that in the former, the experimental flow rate of 254 lb/hr in run 20 should be increased to a value in the order of 363 lb/hr to maximize oil yield. Similarly, the temperatures of 500° C., 525° C. and 550° C. should proceed at flow rates in the order tabulated.

What is claimed is:

1. A method of pyrolyzing lignocellulosic material to produce a high yield of pyrolysis oil, which comprises the steps of:
    (a) providing an entrained flow reactor tube;
    (b) subjecting the lignocellulosic material to a pyrolytic temperature and substantially atmospheric pressure while the material is entrained within the reactor tube in a column of flowing gases, wherein the flowing gases consist essentially of gases generated by burning a quantity of fuel and are substantially free of oxygen;
    (c) withdrawing the entraining gas containing the pyrolysis products from the reactor tube;
    (d) cooling the flowing gases including pyrolysis products entrained therein when pyrolysis has been substantially completed and recovering pyrolysis oil condensed by the cooling; and (e) controlling the temperature of the flowing gases at the onset of pyrolysis, the feed size of the lignocellulosic material, and the space time during which the material is subjected to pyrolysis to recover in excess of 35% of the pyrolysis oil in step (d) on the basis of dry lignocellulosic material, the space time being in the range of about 0.8 to less than about 7 seconds and being controlled in inverse relation to the temperature of the flowing gases.

2. The method as defined in claim 1 wherein the controlled temperature of step (e) is in the range of 400° C. to 550° C.

3. The method as defined in claim 1 wherein the column of flowing gases in step (b) is generated by burning a quantity of fuel to generate hot combustion gases at a temperature substantially greater than the temperature of step (e) and mixing cool gas with such hot combustion gases to effect the temperature control of step (e).

4. The method as defined in claim 3 wherein the controlled temperature of step (e) is in the range of 400° C. to 550° C.

5. The method as defined in claim 3 wherein the lignocellulosic material is pneumatically introduced into the column of flowing gases in at least a portion of said cool gas.

6. The method as defined in claim 5 wherein said cool gas is generated by burning a fuel and quenching the combustion gases thereof with water to provide a cool gas which is saturated with water vapor.

7. The method as defined in claim 3 wherein said cool gas is generated by burning a fuel and quenching the combustion gases thereof with water to provide a cool gas which is saturated with water vapor.

8. The method as defined in claim 7 wherein the quenched combustion gases are the products of essentially stoichiometric burning.

9. The method as defined in claim 6 wherein the quenched combustion gases are the products of essentially stoichiometric burning.

10. The method of pyrolyzing lignocellulosic material to recover, based upon dry weight of the lignocellulosic material, at least about 35% by weight of pyrolysis oil, as well as char and combustible gases, which comprises:

(a) drying lignocellulosic material to a moisture content of not more than 10% by weight;
(b) comminuting the dried lignocellulosic material;
(c) stoichiometrically burning a fuel to provide a substantially oxygen free carrier/moderating gas and then cooling the carrier/modulating gas:
(d) stoichiometrically burning a fuel to provide a substantially oxygen free hot gas;
(e) generating a confined column of flowing gases substantially at atmospheric pressure by mixing the hot gas of step (d) and a temperature moderating portion of the cooled carrier/moderating gas of step (c) while introducing comminuted lignocellulosic material of step (b) at a uniform rate to give maximum yield adjacent the upstream end of the column of flowing gases by pneumatic conveyance in a carrier portion of the cooled carrier/moderating gas of step (c);
(f) controlling the relative flow rates of the hot gas and the cooled carrier/moderating gas introduced in step (e) to provide a selected pyrolysis temperature for the cellulosic material which is within the range of about 400°–550° C., the hot gas and the cooled carrier/moderating gas forming a combined total of inlet gases and controlling the flow rate of the combined total of the inlet gases, relative to the rate of material introduced in step (e) and the length and cross-sectional area of said column of flowing gases, to at least that value which, for said selected temperature, produces at least 35%, by weight of dry lignocellulosic material, of pyrolysis oil; and
(g) recovering char from the downstream end of the column and then substantially immediately condensing the pyrolysis oil to separately recover char, pyrolysis oil and combustible gases from the process.

11. The method as defined in claim 10 wherein the carrier/moderating gas of step (c) is cooled by quenching with water to provide a carrier/moderating gas which is substantially saturated with water vapor.

12. The method as defined in claim 11 wherein the pyrolysis oil produced in step (f) is in excess of about 50% by weight of dry lignocellulosic material.

13. A method of pyrolyzing lignocellulosic material to recover a high yield of pyrolysis oil, which comprises the steps of:

(a) drying and comminuting lignocellulosic material;
(b) entraining the material step (a) in a column of flowing gases in a reactor of a selected length and cross-sectional area to give a space time in a range of about 0.8 to about 7.1 seconds wherein the flowing gases consist essentially of gases generated by burning a quantity of fuel and are substantially free of oxygen;
(c) subjecting the entrained lignocellulosic material to a pyrolysis-initiating temperature in the range of about 400° C. to about 550° C. near the upstream end of said reactor;
(d) substantially completing pyrolysis of the lignocellulosic material by the time it reaches the downstream of the reactor;
(e) recovering char from the flowing gases beyond the downstream end of the reactor and then immediately cooling the flowing gases to condense pyrolysis oil therefrom; and
(f) controlling the pyrolysis-initiating temperature of step (c), the size of the lignocellulosic material of step (a), and the space time of the lignocellulosic material in the reactor to yield pyrolysis oil recovery of in excess of 35% by weight of dry lignocellulosic material, the feed size of the lignocellulosic material being about 40×50 screen size or smaller and the space time being controlled in inverse relation to the pyrolysis-initiating temperature.

14. The method as defined in claim 13 wherein the pyrolysis-initiating temperature of step (c) is about 475° C. and the recovery of pyrolysis oil is at least about 50% by weight of dry lignocellulosic material.

15. A method of pyrolyzing lignocellulosic material to produce a yield of pyrolysis oil which exceeds about 35% by weight of dry lignocellulosic material, which comprises the steps of:

(a) subjecting the lignocellulosic material to a pyrolysis-initiating temperature in the range of about 400°–550° C. at the upstream end of a column of oxygen free gases consisting essentially of gases generated by burning a quantity of fuel flowing at a mass flow rate adjusted to entrain the lignocellulosic material therein and maximize subsequent pyrolysis oil recovery;

(b) substantially completing pyrolysis of the lignocellulosic material within the column of flowing gases to yield flowing gases at the downstream end of the column which are cooled relative to the pyrolysis-initiating temperature of step (a);

(c) immediately further cooling the flowing gases from the downstream end of the column to recover pyrolysis oil condensed by the further cooling; and (d) controlling the temperature of step (a), the feed size of the lignocellulosic material and the space time during which the material is subjected to pyrolysis in the column to recover in excess of about 35% of pyrolysis oil in step (b) on the basis of dry lignocellulosic material, the feed size of the lignocellulosic material being about 40×50 screen size or smaller, and the space time being in the range of about 0.8 to less than about 7.1 seconds and being controlled in inverse relation to the pyrolysis-initiating temperature.

16. The method as defined in claim 15 wherein the pyrolysis initiating temperature is about 475° C. and the space time is about 2.2 seconds.

17. The method as defined in claim 15 wherein the pyrolysis initiating temperature is about 500° C. and the space time is about 1.6 seconds.

18. The method as defined in claim 15 wherein the pyrolysis initiating temperature is about 525° C. and the space time is about 1.1 seconds.

19. The method as defined in claim 15 wherein the pyrolysis initiating temperature is about 550° C. and the space time is about 0.8 seconds.

* * * * *

UNITED STATES PATENT AND TRADEMARK OFFICE
CERTIFICATE OF CORRECTION

PATENT NO. : 4,891,459
DATED : January 2, 1990
INVENTOR(S) : Knight, James A.

It is certified that error appears in the above-indentified patent and that said Letters Patent is hereby corrected as shown below:

Column 1, line 5, insert:

--This invention was made with Government support under Contract No. DE-AC06-76RLO 1830 awarded by the U.S. Department of Energy. The Government has certain rights in this invention--.

Signed and Sealed this

Seventeenth Day of August, 1993

Attest:

BRUCE LEHMAN

*Attesting Officer*  *Commissioner of Patents and Trademarks*